Patented Apr. 25, 1933

1,905,648

UNITED STATES PATENT OFFICE

ROBERT NOTVEST, OF INDIANAPOLIS, INDIANA, ASSIGNOR TO J. D. ADAMS MANUFACTURING COMPANY, OF INDIANAPOLIS, INDIANA, A CORPORATION OF INDIANA

COATED WELDING WIRE

No Drawing.   Application filed February 12, 1932. Serial No. 592,660.

My invention relates to the art of arc-welding, and particularly to the arc-welding of iron and steel. Among the objects of my invention are to produce a coated welding rod which will produce a weld of high tensile strength and ductility, to produce a coated welding rod which will create a slag that may be readily separated from the weld and that will leave a bright finish on the weld, and to produce a welding rod by the use of which welds can be made with greater speed and with a lower consumption of electrical energy than with other rods of which I am aware.

The character of a weld produced by a coated welding rod depends upon both the composition of the rod and the composition of the coating which is applied to the rod. The rod itself should be comparatively free from ingredients such as sulphur and phosphorous which are known to have a deleterious effect on welds. The coating on the rod should be such as will aid in maintaining a stable arc and will produce a slag which will protect the hot welding metal from the atmosphere. Further, the slag should have a lower specific gravity than the molten welding metal in order to prevent the inclusion of slag-particles in the weld, and the slag formed should be non-adherent and brittle in order that it can readily be removed.

In carrying out my invention I prefer to employ a rod containing in the neighborhood of 0.06% carbon. Neither the sulphur content nor the phosphorous content of the rod should exceed 0.03%, and the proportion of either sulphur or phosphorous is preferably not greater than 0.02%. I have found that welds produced with such a rod, especially when the rod has been coated with the coating hereinafter described, have a very satisfactory tensile strength in the neighborhood of 65,000 lbs. per square inch, and are very ductile, having an elongation of 24% to 28%.

To a rod of the composition above set forth, I apply a heavy coating composed chiefly of ferric oxide ($Fe_2O_3$), silica ($SiO_2$), and a binder, the binder being preferably a water solution of sodium or potassium silicate. In addition to the ingredients just noted, the coating composition preferably also includes sufficient calcium carbonate to make the liquid coating composition substantially neutral to litmus.

The rods are prepared by repeatedly dipping them into the coating composition, the rods being dried after each dipping. For a rod one-quarter inch in diameter, a satisfactory coating can be produced with 8 to 10 dippings. This procedure will produce on a one-quarter inch rod a coating slightly over one-sixteenth of an inch in thickness. Smaller rods will require coatings of less thickness, and larger rods heavier coatings.

I find that for best results the ferric oxide and silica should be used in the respective proportions of about 55 parts of ferric oxide to 45 parts of silica, by weight. These proportions may be varied from 50 parts ferric oxide and 50 parts silica to 60 parts ferric oxide and 40 parts silica. With these ingredients present in these approximate proportions, and with a coating of the approximate thickness above set forth, the slag produced during the welding operation will form a comparatively heavy blanket on the weld and will protect the weld and prevent too rapid cooling and contact with the atmosphere. The slag formed by the coating such as has just been described has a congealing temperature of 100° to 150° C. below the melting point of the fusion metal itself. In practice, this means that the slag will congeal while the fusion metal beneath it is still molten. This is important; for if the slag has a higher congealing temperature it is difficult to remove from the weld, and if its congealing temperature is lower it will flow too freely, will not satisfactorily confine the molten fusion metal, and will not provide a thick covering for the weld. Further, the slag produced by a coating of this composition has a co-efficient of expansion several times greater than that of the fusion metal; and as the result of this, the slag in cooling tends to separate from the weld.

In regard to the ease of separating the slag from the weld, I find it advisable to insure substantially complete neutrality of the liquid coating composition, and that if the coating composition is either slightly acid or slightly alkaline the slag has a marked tendency to adhere to the weld and can be removed only with great difficulty.

I find that additional advantages can be secured by replacing a portion of the silica with a small proportion of metallic silicon in a finely divided state in the coating. At the temperature of the arc, this metallic silicon reacts with the ferric oxide in the coating in a manner analogous to the well known Thermit reaction, silica and iron resulting. This reaction is indicated by the following formula:

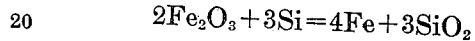

$$2Fe_2O_3 + 3Si = 4Fe + 3SiO_2$$

I find further that the percentage of free silicon which is included in the coating must be kept below a certain maximum if satisfactory control of the welding operation is to be obtained. That is, I find that if the silicon forms much more than 5% by weight of the coating the reaction between it and the ferric oxide of the coating proceeds with such rapidity that the coating melts away faster than the rod is melted. I prefer to employ about 1½–2½% of free silicon in the coating.

I do not limit myself to the use of silicon as the only metal which may be present in a free state in the coating, as other metals capable of completely reducing ferric oxide with accompanying release of heat may be used. The metals suitable for such use, of course, are those which will not have a deleterious effect on the fusion metal or which will not form with the fusion metals alloys of undesirable properties. Among the metals which may be used instead of silicon are calcium, barium, and boron. Aluminum may also be used, if its effect on the weld is not objectionable.

In making my preferred welding-rod coating, I mix together approximately 55 parts of ferric oxide, 42 parts silica, 3 parts finely divided metallic silicon, and 6 parts calcium carbonate. These ingredients are all preferably at least sufficiently fine to pass an 80 mesh screen. The binder is prepared by diluting two parts commercial sodium silicate solution (40° Beaumé) with one part water. About 16 pounds of the dry ingredients are suspended in three quarts of the binder, and the rods are then repeatedly dipped in the coating preparation until a coating of the desired thickness is built up. Preferably, the rods are dried under heat after each dipping.

As previously indicated, the chief function of the calcium carbonate is to render the coating composition substantially neutral. The amount of calcium carbonate used, therefore, will depend to a certain extent upon the character of the other ingredients included in the coating composition.

I find that a welding rod prepared as above set forth will produce a weld having a highly satisfactory tensile strength and ductility in comparison with welds produced by other welding rods now on the market, that the slag is easily removed leaving a bright surface on the metal of the weld, that a given quantity of welding metal can be deposited in materially less time than with other welding rods of which I am aware, and that a saving of 20% to 30% in the quantity of electrical energy necessary to secure fusion is noted.

The welding rod above described is especially suitable for straight-polarity welding—that is, welding in which the rod is connected to the negative side of the current source.

I claim as my invention:

1. A coating composition for an arc-welding rod, comprising approximately 55 parts by weight of ferric oxide and 45 parts by weight of silica, a binder composed of sodium silicate and water, and sufficient calcium carbonate to render the coating composition neutral.

2. A coating composition for an arc-welding rod, comprising approximately 55 parts by weight of ferric oxide and 45 parts by weight of silica, a binder, and sufficient calcium carbonate to render the coating composition neutral.

3. A coating composition for an arc-welding rod, comprising a mixture of approximately 1 to 2 parts of ferric oxide, 1 part silica, a binder, and finely divided silicon, the silicon being present in quantity not greater than ten per-cent of the coating composition.

4. A coating composition for an arc-welding rod, comprising a mixture of approximately 1 to 2 parts ferric oxide, 1 part silica, a binder, and finely divided silicon.

5. A coating composition for an arc-welding rod, comprising a mixture of approximately 1 to 2 parts ferric oxide, 1 part silica, a binder, and a finely divided metal capable of reducing iron oxide in an exothermic reaction at the temperature of the arc.

In witness whereof, I have hereunto set my hand at Indianapolis, Indiana, this 2nd day of February, A. D. one thousand nine hundred and thirty-two.

ROBERT NOTVEST.